US009025281B2

(12) United States Patent
Rejda et al.

(10) Patent No.: US 9,025,281 B2
(45) Date of Patent: May 5, 2015

(54) MAGNETIC DEVICE INCLUDING A NEAR FIELD TRANSDUCER

(71) Applicant: Seagate Technology LLC, Cupertino, CA (US)

(72) Inventors: Edwin F. Rejda, Bloomington, MN (US); Kurt W. Wierman, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/973,532

(22) Filed: Aug. 22, 2013

(65) Prior Publication Data

US 2015/0055441 A1    Feb. 26, 2015

(51) Int. Cl.
G11B 5/31      (2006.01)
G11B 5/00      (2006.01)

(52) U.S. Cl.
CPC ............ G11B 5/3106 (2013.01); G11B 5/3116 (2013.01); G11B 2005/0021 (2013.01)

(58) Field of Classification Search
USPC ............... 360/125.31, 125.3, 125.03, 125.09, 360/125.04, 125.17, 125.12, 125.16, 360/125.06, 125.15
See application file for complete search history.

(56) References Cited

U.S. PATENT DOCUMENTS

| 5,870,362 | A | * | 2/1999 | Boutaghou | 369/44.14 |
| 7,250,598 | B2 | * | 7/2007 | Hollingsworth et al. | 250/234 |
| 7,948,712 | B2 | | 5/2011 | Martin | |
| 7,961,417 | B2 | * | 6/2011 | Seigler et al. | 360/59 |
| 8,116,036 | B2 | | 2/2012 | Brand | |
| 8,259,540 | B1 | | 9/2012 | Sahoo | |
| 8,289,650 | B2 | * | 10/2012 | Seigler et al. | 360/125.3 |
| 8,307,540 | B1 | * | 11/2012 | Tran et al. | 29/603.16 |
| 8,320,219 | B1 | * | 11/2012 | Wolf et al. | 369/13.33 |
| 8,351,305 | B2 | | 1/2013 | Zhou | |
| 8,405,932 | B2 | * | 3/2013 | Seigler et al. | 360/125.3 |
| 8,416,647 | B1 | | 4/2013 | Zhao | |
| 8,427,925 | B2 | | 4/2013 | Zhao | |
| 8,634,280 | B1 | * | 1/2014 | Wang et al. | 369/13.33 |
| 8,675,455 | B1 | * | 3/2014 | Krichevsky et al. | 369/13.24 |
| 8,721,902 | B1 | * | 5/2014 | Wang et al. | 216/22 |
| 2010/0328807 | A1 | * | 12/2010 | Snyder et al. | 360/59 |
| 2012/0147718 | A1 | * | 6/2012 | Hellwig et al. | 369/13.33 |
| 2014/0177405 | A1 | * | 6/2014 | Rejda et al. | 369/13.02 |

* cited by examiner

Primary Examiner — Allen T Cao
(74) Attorney, Agent, or Firm — Mueting, Raasch & Gebhardt, P.A.

(57) ABSTRACT

A recording device and a method of forming a recording device are disclosed. The recording device includes an air bearing surface and a near field transducer including a surface proximate the air bearing surface. The device also includes a write pole including a sloped pole piece proximate the near field transducer, where the sloped pole piece includes an end proximate the air bearing surface; a capping material disposed proximate the surface of the near field transducer; and an overcoat layer disposed proximate the capping material and at least a portion of the air bearing surface of the recording device.

20 Claims, 5 Drawing Sheets

MAGNETIC DEVICE INCLUDING A NEAR FIELD TRANSDUCER

BACKGROUND

Heat assisted magnetic recording (HAMR) generally refers to the concept of locally heating a recording media to reduce the coercivity. This allows the applied magnetic writing fields to more easily direct the magnetization during the temporary magnetic softening caused by the heat source. HAMR allows for the use of small grain media with a larger magnetic anisotropy at room temperature to assure sufficient thermal stability, which is desirable for recording at increased areal densities. HAMR can be applied to any type of magnetic storage media, including tilted media, longitudinal media, perpendicular media, and patterned media. By heating the media, the coercivity is reduced such that the magnetic write field is sufficient to write to the media. Once the media cools to ambient temperature, the coercivity has a sufficiently high value to assure thermal stability of the recorded information.

In disc drives and other transducing systems that can be used with the HAMR process and other types of magnetic recording processes, a transducer is carried by a structure proximate to a recording media. Over time, however, operation of the system can cause wear of the surface of this structure. To protect the structure against wear, an overcoat, which is formed with a relatively thin layer of material such as carbon, can be provided on the surface of the structure that confronts the recording media.

SUMMARY

In one aspect, the present disclosure provides a recording device including an air bearing surface. The recording device also includes a near field transducer including a surface proximate the air bearing surface, and a write pole including a sloped pole piece proximate the near field transducer. The sloped pole piece includes an end proximate the air bearing surface. The device also includes a capping material disposed proximate the surface of the near field transducer, and an overcoat layer disposed proximate the capping material and at least a portion of the air bearing surface of the recording device.

In another aspect, the present disclosure provides a method that includes forming a recording device that includes an air bearing surface and a near field transducer, and selectively removing a portion of the near field transducer proximate the air bearing surface to form a surface of the near field transducer. The method also includes forming a capping material proximate the surface of the near field transducer, and forming an overcoat layer proximate the capping material and at least a portion of the air bearing surface.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

In general, the present disclosure provides magnetic recording devices, systems including these devices, and methods of forming such devices. In some embodiments, a recording device can include an air bearing surface, a near field transducer including a surface proximate the air bearing surface; a capping material disposed proximate the surface of the near field transducer; and an overcoat layer disposed proximate the capping material and at least a portion of the air bearing surface of the recording device.

The disclosed devices and systems can offer the advantage of providing more efficient transfer of energy from an energy source to the magnetic storage media to be heated, a smaller focal point at the point of heating, or some combination thereof. In some embodiments, the disclosed devices can be used within other devices or systems, such as magnetic recording heads, more specifically, thermally or heat assisted magnetic recording (HAMR) heads, or disc drives that include such devices.

The heat assisted magnetic recording (HAMR) process can involve an environment that can be extremely corrosive because of the high temperature and exposure to corrosive chemistries. Furthermore, designs using close head-media spacing can experience more rapid wear of any narrow, protruded features such as write poles. Because of the harsh environment and the desire to protect some of the more delicate structures, for example the near field transducer (NFT) and the write pole, there remains a need for different types of overcoats.

Figure 1:
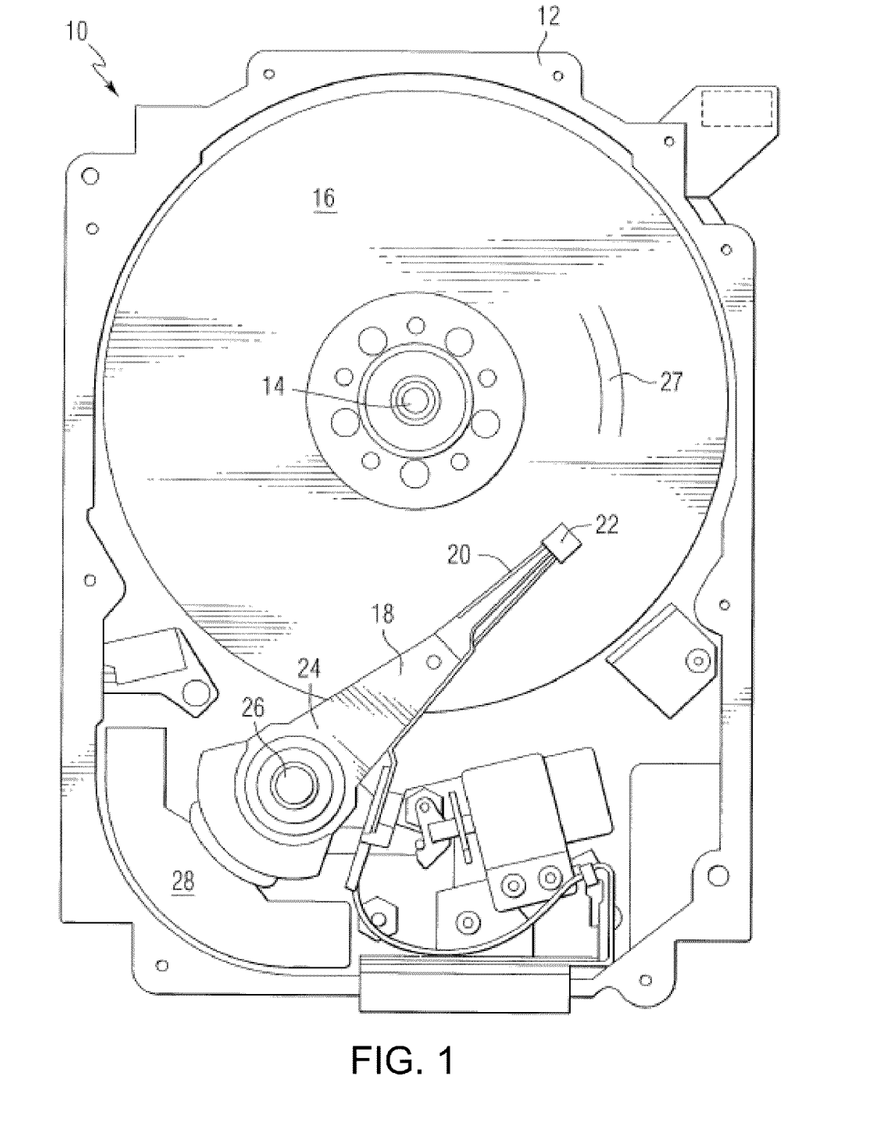
FIG. 1 is a schematic plan view of one embodiment of a disc drive system.

FIG. 1 is a schematic plan view of a data storage device in the form of a disc drive 10 that can utilize the disclosed recording devices. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm" second end 24 for pivoting the arm 18 to position the recording head 22 over a desired sector or track 27 of the disc 16. The actuator motor 28 is regulated by a controller, which is not shown in this view and is well-known in the art. The storage media may include, for example, continuous media or bit patterned media.

For heat assisted magnetic recording (HAMR), electromagnetic radiation, for example, visible, infrared, or ultraviolet light is directed onto a surface of the data storage media to raise the temperature of a localized area of the media to facilitate switching of the magnetization of the area. Recent designs of HAMR recording heads include a thin film waveguide on a slider to guide light toward the storage media and a near field transducer to focus the light to a spot size smaller than the diffraction limit.

Figure 2A:
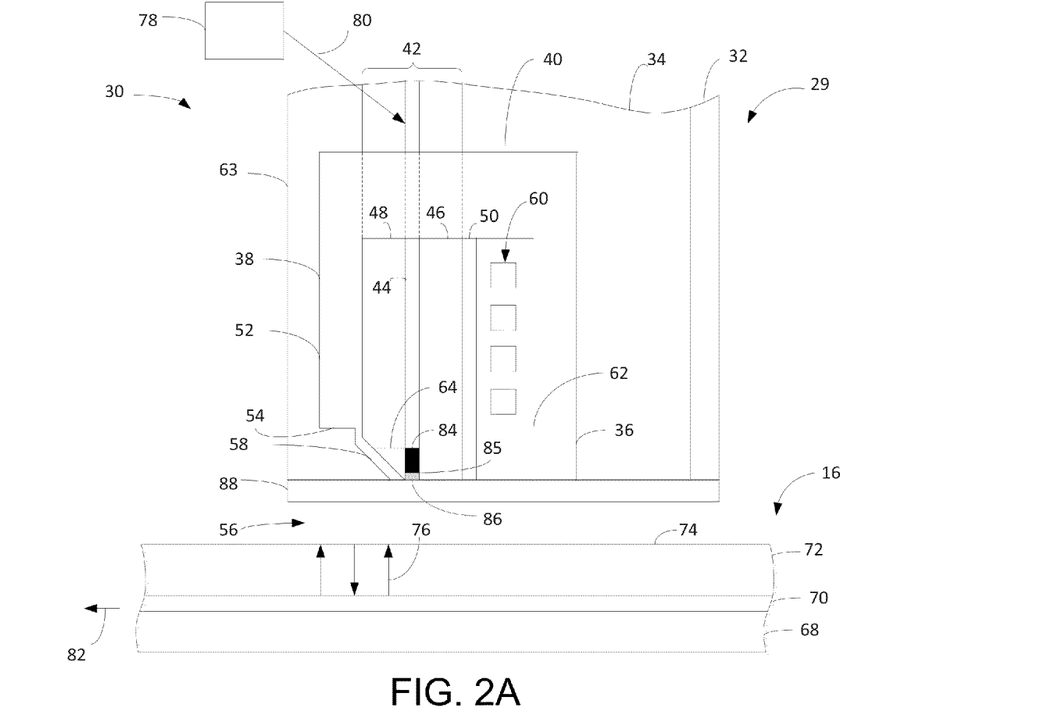
FIG. 2A is a schematic cross-section view of one embodiment of a recording device that includes a near field transducer and capping material proximate a surface of the transducer.

FIG. 2A is a schematic cross-section view of a system 29 that includes a recording head or device 30. Magnetic media 16 is positioned proximate an air bearing surface (ABS) 56 of the recording device 30. The recording device 30 includes a substrate 32, a base coat 34 on the substrate, a bottom pole 36 on the base coat, and a top pole 38 that is magnetically coupled to the bottom pole through a yoke or pedestal 40. In some embodiments, the top pole 38 serves as a write pole and the bottom pole 36 serves as a return pole. A waveguide 42 is positioned between the write and return poles 36, 38. The waveguide 42 includes a core layer 44 and cladding layers 46 and 48 on opposite sides of the core layer. Other types of waveguides or structures for guiding and/or focusing the electromagnetic radiation can also be utilized herein. In some embodiments, a mirror 50 can optionally be positioned proximate one of the cladding layers.

The write pole 38 is a two-piece pole that includes a first portion, or pole body 52, having a first end 54 that is spaced from ABS 56, and a second portion, or sloped pole piece 58, extending from the first portion and tilted in a direction toward the return pole 36. The sloped pole piece 58 is structured to include an end 59 (FIG. 2B) proximate to the air bearing surface 56 of the recording device, with the end being closer to the waveguide 42 than the first portion 52 of the write pole 38. A planar coil 60 also extends between the write and return poles 36, 38 and around the pedestal 40.

An insulating material 62 separates the coil turns. In one example, the substrate can be AlTiC, the core layer can be $Ta_2O_5$, and the cladding layers 48, 50 (and other insulating layers) can be $Al_2O_3$. A top layer of insulating material 63 can be formed on the write pole 38. A heat sink 64 is positioned proximate the sloped pole piece 58. The heat sink 64 can include a non-magnetic material, e.g., Au.

As illustrated in FIG. 2A, the recording device 30 includes a structure for heating the magnetic storage media 16 proximate to where the sloped pole piece 58 applies the magnetic write field H to the storage media 16. In this example, the media 16 includes a substrate 68, a heat sink layer 70, a magnetic recording layer 72, and a protective layer 74. However, other types of media, such as bit patterned media can be used. A magnetic field H produced by current in the coil 60 is used to control the direction of magnetization of bits 76 in the recording layer 72 of the media.

The storage media 16 is positioned proximate or under the recording device 30. The waveguide 42 conducts light from a source 78 of electromagnetic radiation, which may be, for example, ultraviolet, infrared, or visible light. The source 78 may be, for example, a laser diode, or other suitable laser light source for directing a light beam 80 toward the waveguide 42. Specific exemplary types of light sources 78 can include, for example laser diodes, light emitting diodes (LEDs), edge emitting laser diodes (EELs), vertical cavity surface emitting lasers (VCSELs), and surface emitting diodes. In some embodiments, the light source 78 can produce energy having a wavelength of 830 nm, for example. Various techniques that are known for coupling the light beam 80 into the waveguide 42 can be used. Once the light beam 80 is coupled into the waveguide 42, the light propagates through the waveguide 42 toward a truncated end of the waveguide 42 that is formed proximate the ABS 56 of the recording device 30. Light exits the end of the waveguide 42 and heats a portion of the media 16, as the media moves relative to the recording head as shown by arrow 82. Energy delivered by a near field transducer (NFT) 84 is the primary means of heating the media 16. The NFT 84 is positioned in or proximate the waveguide 42 and at or near ABS 56 and can include any suitable NFT. In some embodiments, the sloped pole piece 58 is proximate the NFT 84.

The device 30 can include a heat sink 64 made of a thermally conductive material integral to, or in direct contact with, NFT 84, and chosen such that it does not prevent coupling of electromagnetic energy into and out of NFT 84. The heat sink 64 can include a single structure or multiple connected structures, positioned such that they can transfer heat to other metallic features in the device 30 and/or to the gas flow external to the device.

Figure 2B:
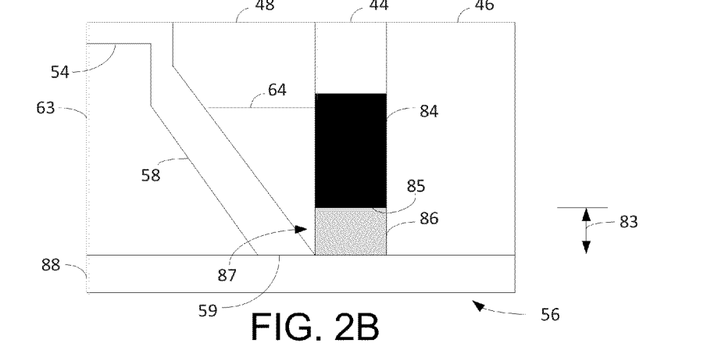
FIG. 2B is a partial schematic cross-section view of a portion of the recording device of FIG. 2A.

As shown in FIG. 2B, which is a partial schematic cross-section view of a portion of the device 30 of FIG. 2A, NFT 84 includes a surface 85 proximate the air bearing surface 56. Disposed proximate this surface 85 is capping material 86. In some embodiments, the capping material 86 is positioned between the surface 85 of NFT 84 and the air bearing surface 56. The capping material can include any suitable material or materials, e.g., Ti, Fe, Co, Ni, Ta, Zr, Cr, Al, Y, Mo, W, Hf, Rh, Au, Si, Cu, and Ag, oxides or nitrides thereof, or combinations thereof.

The capping material 86 can be formed or disposed proximate the surface 85 of NFT 84 using any suitable technique or techniques as is further described herein. In some embodiments, the capping material 86 is disposed or formed directly on surface 85. In other embodiments, one or more additional layers can be formed between surface 85 and the capping material 86, e.g., layers that include one or more of Ti, Fe, Co, Ni, Ta, Zr, Cr, Al, Mo, W, Hf, Rh, Cu, and Ag, oxides or nitrides thereof, or combinations thereof.

In some embodiments, the surface 85 of NFT 84 is offset from the end 59 of the sloped pole piece 58 of the write pole 38 an offset distance 83 to form a recess 87. The recess 87 can be formed between the heat sink 64 and the cladding 46 of the waveguide 42 (or the layer proximate the NFT in embodiments that include alternative waveguides or other structures that guide and/or focus electromagnetic radiation). In some embodiments, a portion of one or both of the heat sink 64 and wave guide cladding 46 can also be removed to form the recess 87.

The capping material 86 is disposed proximate the surface 85 of NFT 84 within this recess 87. The offset distance 83 can be any suitable distance. In some embodiments, the offset distance 83 is at least about 1 nm. In other embodiments, the offset distance 83 is no greater than about 50 nm.

The capping material 86 can substantially fill the recess 87 such that the offset distance 83 and the thickness of the capping material are substantially equal. In other embodiments, the thickness of the capping material 86 can be less than the offset distance 83. The capping material 86 can have any suitable thickness. In some embodiments, the capping material 86 has a thickness that is at least about 1 nm. In other embodiments, the capping material 86 can have a thickness that is no greater than about 50 nm.

The recording device 30 also includes an overcoat layer 88 disposed proximate the capping material 86 and at least a portion of the air bearing surface 56 of device 30. The overcoat layer 88 can include any suitable material or materials that provide desired properties to the device 30. For example, the particular materials that can be included in the overcoat layer 88 can be chosen by considering a number of properties, including magnetic properties, electrical properties, corrosion properties, physical properties, wear resistant properties, and optical properties. When choosing an appropriate material for an overcoat layer, one or more than one of these properties (and/or properties not discussed herein) can be considered.

The HAMR recording process can involve an environment that can be extremely corrosive due to high temperature and exposure to corrosive chemistries. Typically, diamond like carbon (DLC) has been used as an overcoat to protect the write pole material from corrosion. The DLC can also protect features from erosion due to mechanical wear. Instances have been seen in which the DLC has been unable to completely mitigate write pole corrosion. In addition, localized thermal protrusion during the HAMR recording process can subject the recording device to significant burnishing, which in turn can remove a protective head overcoat and accelerate the corrosion process. The aggressive HAMR environment can also lead to DLC failure over the NFT, which can allow migration of the NFT material and eventual device failure. Forming capping material and an overcoat over the NFT can function to improve thermal, chemical, and mechanical reliability in the local writer and NFT region. Such capping material may also be advantageous because it does not increase the thickness of the overcoat over the reader, which increases the head to media spacing (HMS), thereby potentially resulting in a significant performance penalty.

In some embodiments, the overcoat layer 88 can be formed directly on the capping material 86 and the air bearing surface 56 of the device 30. In other embodiments, one or more additional layers can be formed between one or both of the overcoat layer 88 and the capping material 86 and the air bearing surface 56, e.g., layers that include one or more of Ti, Ni, Ta, Zr, Cr, Al, Y, Mo, W, Hf, Rh, Si, and Ag, oxides or nitrides thereof, or combinations thereof.

The overcoat layer 88 can be formed or disposed proximate at least a portion of ABS 56. In some embodiments, the overcoat layer 88 can be formed or disposed proximate substantially all of ABS 56. The overcoat layer 88 can be formed or disposed using any suitable technique or techniques as is further described herein.

In some embodiments, the capping material 86 and the overcoat layer 88 can include the same material or materials.

In other embodiments, the capping material 86 and the overcoat layer 88 can include different materials. For example, in one exemplary embodiment, the capping material 86 can include Tantalum Oxide, and the overcoat layer 88 can include Tantalum Oxide and DLC.

In some embodiments, for example embodiments where the device is a HAMR device, optical properties of one or both of the capping material 86 and overcoat layer 84 may be taken into consideration. In some embodiments, materials that have optical properties that are at least as good as diamond like carbon (DLC) can be utilized. Optical properties that can be considered can include, for example, the refractive index (n) and the extinction coefficient ($\kappa$). It is generally desirable that the refractive index be relatively large and the extinction coefficient be relatively small. In some embodiments, the refractive index can be at least as high as that of DLC. The refractive index of DLC at 830 nm can range from about 2.095 to about 2.175. In some embodiments, a material having an index of refraction at 830 nm of at least about 2.0 can be utilized. In some embodiments, the extinction coefficient can be no higher than that of DLC. The extinction coefficient of DLC at 830 nm can range from about 0.01 to about 0.21. In some embodiments, a material having an extinction coefficient at 830 nm of less than about 0.1 can be utilized. In some embodiments, a material having an extinction coefficient at 830 nm of less than about 0.10 can be utilized.

Although the embodiment of FIGS. 2A-B shows a perpendicular magnetic recording head and a perpendicular magnetic storage media, it will be appreciated that the disclosure may also be used in conjunction with other types of recording heads and/or storage media where it may be desirable to concentrate light to a small spot.

While not shown in FIGS. 2A-B, the recording device 30 can also include a reading device positioned proximate the recording device that is configured to read the magnetic state of the magnetic storage media 16. The reading device can include any suitable device or devices to perform this function.

Any suitable technique or techniques can be utilized to form the recording devices and systems of the present application. And any suitable technique or techniques can be utilized to form a near field transducer with a capping material provided on a surface of the transducer, and an overcoat layer on an air bearing surface of the device as described herein. For example, FIGS. 3A-F illustrate one embodiment of a method of forming a recording device that includes capping material and overcoat layer as described herein.

Figure 3A:
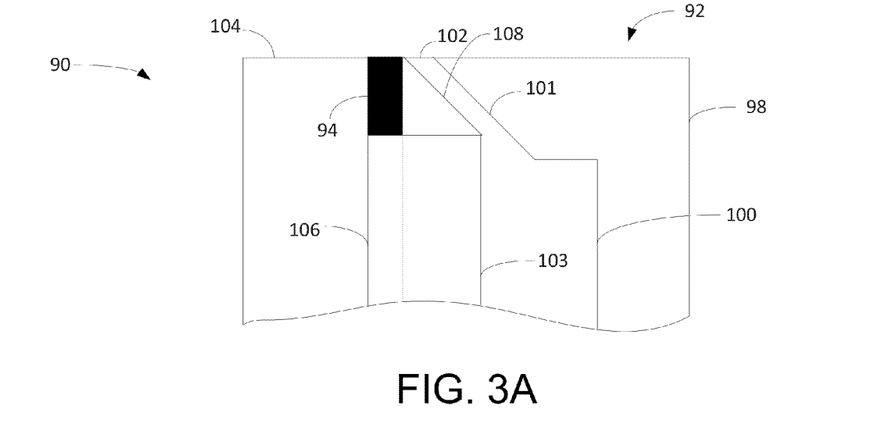
FIGS. 3A-F are schematic cross-section views of one embodiment of a method of forming a recording device.

As shown in FIG. 3A, a recording device 90 is formed using any suitable technique or techniques. The recording device 90 can include any suitable recording device, e.g., recording device 30 of FIG. 2. The recording device 90 is schematically illustrated in an orientation that is rotated from the orientation of recording device 30 of FIGS. 2A-B to better illustrate the described method. And only a portion of the recording device 90 is shown for illustrative purposes only.

The device 90 includes a top layer 98 of insulative material and a write pole 100 having a slopped pole piece 101. The slopped pole piece 101 includes an end 102 proximate an ABS 92 of the device. The device 90 also includes a waveguide that includes cladding 103, 104, and core layer 106. The device 90 also includes a heat sink 108 positioned proximate an NFT 94. The sloped pole piece 101 is proximate the NFT 94.

Although not shown, an initial step of finelapping the ABS 92 can be performed to expose NFT 94 if there is material between the NFT and the ABS.

Figure 3B:
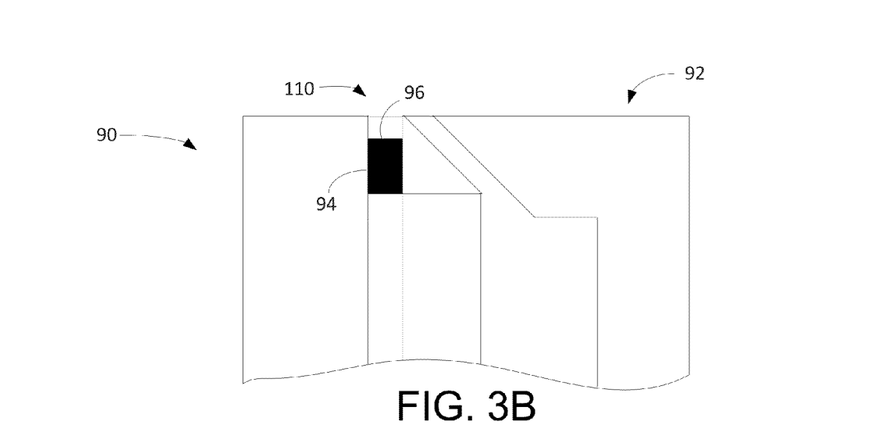

In FIG. 3B, a portion of NFT 94 proximate ABS 92 is selectively removed to form a surface 96 within recess 110. Any suitable technique can be used to remove this portion of NFT 94. For example, a mask layer can be deposited over at least a portion of ABS 92 of the device 90. This mask layer can include various materials. In some embodiments, the mask layer can be a material that can be patterned to form voids to ultimately provide various structures. As such, the mask layer can include a photoresist.

The NFT 94 can be etched to a selected depth from ABS 92 to form the surface 96 and the recess 110 proximate NFT 94. Any suitable etching technique can be used to selectively remove the portion of NFT 94, e.g., ion beam etching, reactive ion beam etching, etc. As described herein, the recess 110 can have any suitable shape and dimension such that NFT 94 can be offset from the end 102 of sloped pole piece 101 of write pole 100 an offset distance as is further described herein.

Figure 3C:
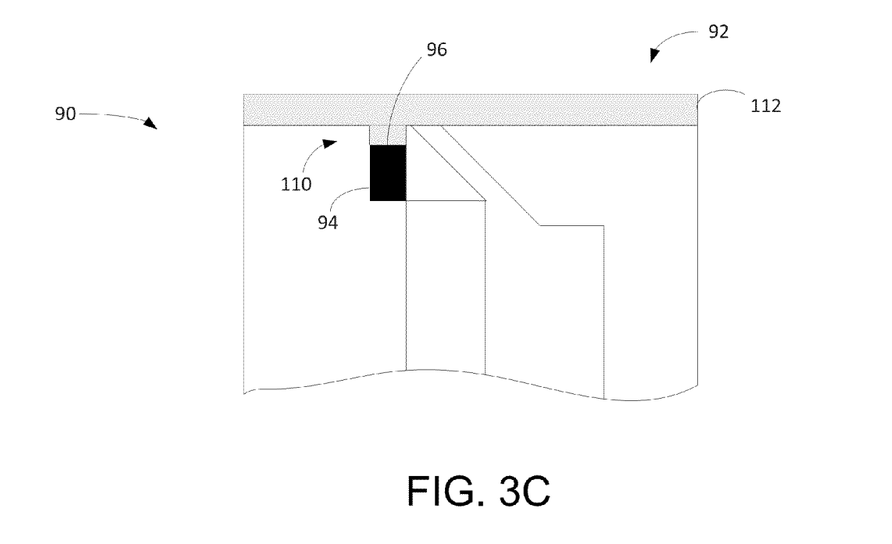

A capping material 112 can be formed proximate the surface 96 of NFT 94 as is shown in FIG. 3C. In some embodiments, the capping material 112 can be formed only within the recess 110. In other embodiments, the capping material 112 can be formed within the recess 110 and on at least a portion of ABS 92. Any suitable technique can be utilized to form the capping material 112, e.g., sputter deposition, plasma vapor deposition, chemical vapor deposition, atomic layer deposition, and suitable evaporative techniques.

Figure 3D:
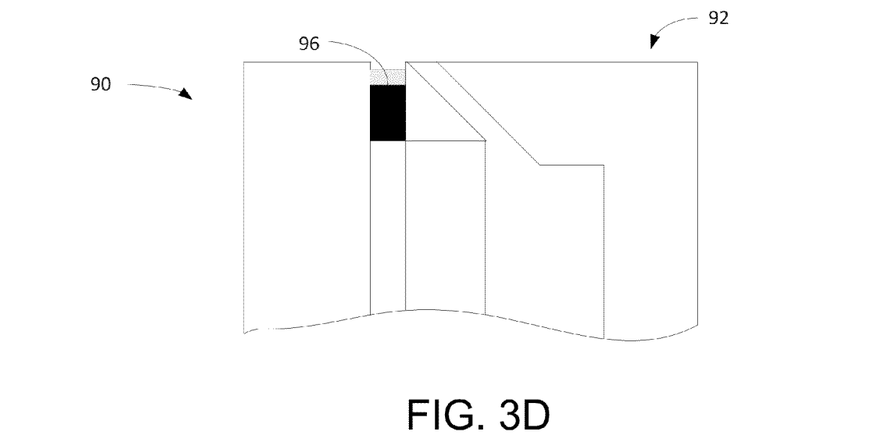

If capping material 112 is formed on at least a portion of ABS 92 while forming the material in the recess 110, then the capping material on the ABS can be removed using any suitable technique as shown in FIG. 3D. For example, ABS 92 can be kisslapped or etched to remove the capping material 112 from ABS 92 while leaving capping material within the recess 110. Further, if a mask layer is utilized, then any suitable technique can be used to remove the excess capping material and the mask layer, e.g., any combination of ion beam etching, photoresist stripping solvents.

Figure 3E:
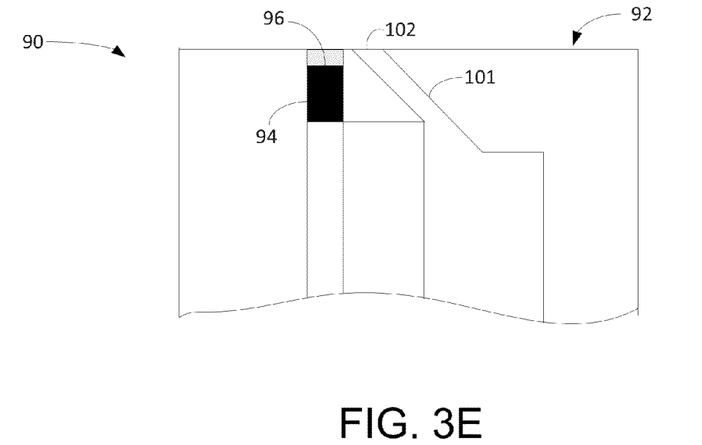

In FIG. 3E, a portion of ABS 92 of the device 90 can be removed to provide the desired offset distance for NFT 94 from the end 102 of the sloped pole piece 101. Any suitable technique can be utilized, e.g., kisslapping, etc.

Figure 3F:
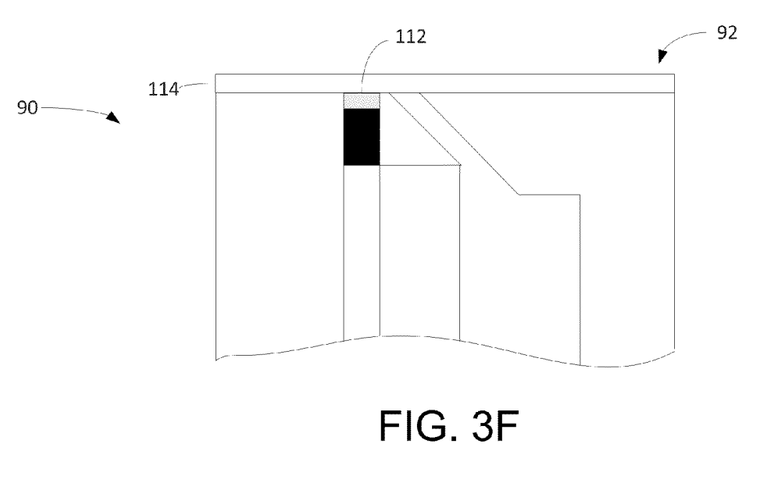

An overcoat layer 114 as described herein can be formed proximate at least a portion of ABS 92 of the device 90 and the capping material 112 as shown in FIG. 3F. Any suitable technique can be utilized to form the overcoat layer 114, e.g., sputter deposition, plasma vapor deposition, chemical vapor deposition, atomic layer deposition, and suitable evaporative techniques.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A recording device comprising an air bearing surface, wherein the device further comprises:
    a near field transducer comprising a surface proximate the air bearing surface;
    a write pole comprising a sloped pole piece proximate the near field transducer, wherein the sloped pole piece comprises an end proximate the air bearing surface;
    a capping material disposed proximate the surface of the near field transducer, wherein the capping material has a refractive index at 830 nm of at least about 2.0 and no greater than about 2.75; and
    an overcoat layer disposed proximate the capping material and at least a portion of the air bearing surface of the recording device.

2. The device of claim 1, wherein the surface of the near field transducer is offset from the end of the sloped pole piece of the write pole an offset distance to form a recess, and wherein the capping material is disposed on the surface of the near field transducer within the recess.

3. The device of claim 2, wherein the offset distance is at least about 1 nm and no greater than about 50 nm.

4. The device of claim 1, wherein the capping material comprises a thickness that is at least about 1 nm and no greater than about 50 nm.

5. The device of claim 1, wherein the capping material comprises a material selected from the group consisting of Ti, Fe, Co, Ni, Ta, Zr, Cr, Al, Y, Mo, W, Hf, Rh, Au, Si, Cu, and Ag, oxides or nitrides thereof, or combinations thereof.

6. The device of claim 1, wherein the capping material and the overcoat layer comprise the same material.

7. The device of claim 1, wherein the overcoat layer comprises diamond like carbon (DLC).

8. The device of claim 1, wherein the capping material has an extinction coefficient at 830 nm of no greater than about 0.1.

9. The device of claim 1, further comprising a heat sink proximate the near field transducer.

10. A system, comprising:
    the recording device of claim 1; and
    magnetic media proximate the air bearing surface of the device.

11. A method comprising:
    forming a recording device comprising an air bearing surface and a near field transducer;
    selectively removing a portion of the near field transducer proximate the air bearing surface to form a surface of the near filed transducer, wherein selectively removing the portion of the near field transducer comprises etching the near field transducer to a selected depth from the air bearing surface to form the surface of the near field transducer and a recess proximate the near field transducer such that the surface of the near field transducer is offset from an end of a sloped pole piece of a write pole an offset distance, wherein the sloped pole piece is proximate the near field transducer, and further wherein the end of the sloped pole piece is proximate the air bearing surface;
    forming a capping material proximate the surface of the near field transducer; and
    forming an overcoat layer proximate the capping material and at least a portion of the air bearing surface.

12. The method of claim 11, wherein forming the capping material comprises:
    forming the capping material on the air bearing surface and the surface of the near field transducer; and
    removing the capping material from the air bearing surface.

13. The method of claim 11, wherein the overcoat layer comprises diamond like carbon (DLC).

14. The method of claim 11, wherein forming the capping material further comprises forming the capping material within the recess.

15. The method of claim 14, further comprising lapping the air bearing surface of the recording device such that the capping material proximate the near field transducer is at the air bearing surface.

16. The method of claim 11, further comprising removing a portion of the air bearing surface to expose the near field transducer prior to selectively removing a portion of the near field transducer.

17. The method of claim 11, wherein forming the recording device further comprises forming a heat sink proximate the near field transducer.

18. The method of claim 11, further comprising forming a mask layer on at least a portion of the air bearing surface of the recording device prior to selectively removing a portion of the near field transducer proximate the air bearing surface.

19. The method of claim 11, wherein the capping material has a refractive index at 830 nm of at least about 2.0 and no greater than about 2.75.

20. A recording device comprising an air bearing surface, wherein the device further comprises:

a near field transducer comprising a surface proximate the air bearing surface;

a write pole comprising a sloped pole piece proximate the near field transducer, wherein the sloped pole piece comprises an end proximate the air bearing surface;

a capping material disposed proximate the surface of the near field transducer; and an overcoat layer disposed proximate the capping material and at least a portion of the air bearing surface of the recording device;

wherein the surface of the near field transducer is offset from the end of the sloped pole piece of the write pole an offset distance to form a recess, and wherein the capping material is disposed on the surface of the near field transducer within the recess.

* * * * *